United States Patent
Nakamoto et al.

(10) Patent No.: US 10,414,919 B2
(45) Date of Patent: Sep. 17, 2019

(54) REINFORCED THERMOPLASTIC RESIN COMPOSITION AND MOLDED ARTICLE THEREOF

(71) Applicant: UMG ABS, LTD., Tokyo (JP)

(72) Inventors: Masahito Nakamoto, Yamaguchi (JP); Hideichiro Kawaguchi, Yamaguchi (JP)

(73) Assignee: UMG ABS, LTD., Tokyo (JP)

(*) Notice: Subject to any disclaimer, the term of this patent is extended or adjusted under 35 U.S.C. 154(b) by 0 days.

(21) Appl. No.: 14/908,391

(22) PCT Filed: Oct. 5, 2015

(86) PCT No.: PCT/JP2015/078168
§ 371 (c)(1),
(2) Date: Jan. 28, 2016

(87) PCT Pub. No.: WO2016/088443
PCT Pub. Date: Jun. 9, 2016

(65) Prior Publication Data
US 2016/0319126 A1 Nov. 3, 2016

(30) Foreign Application Priority Data
Dec. 2, 2014 (JP) ................................. 2014-243935

(51) Int. Cl.
| | | |
|---|---|---|
| *C08L 69/00* | (2006.01) | |
| *C08L 63/00* | (2006.01) | |
| *C08J 5/04* | (2006.01) | |
| *C08L 55/02* | (2006.01) | |
| *C08L 67/02* | (2006.01) | |
| *C08K 3/013* | (2018.01) | |
| *C08L 51/04* | (2006.01) | |
| *C08F 265/04* | (2006.01) | |
| *C08F 279/04* | (2006.01) | |
| *C08F 285/00* | (2006.01) | |
| *C08J 5/00* | (2006.01) | |

(52) U.S. Cl.
CPC ............ *C08L 69/00* (2013.01); *C08F 265/04* (2013.01); *C08F 279/04* (2013.01); *C08F 285/00* (2013.01); *C08J 5/00* (2013.01); *C08J 5/04* (2013.01); *C08K 3/013* (2018.01); *C08L 55/02* (2013.01); *C08L 63/00* (2013.01); *C08L 67/02* (2013.01); *C08J 2369/00* (2013.01); *C08J 2427/18* (2013.01); *C08J 2435/02* (2013.01); *C08J 2451/00* (2013.01); *C08J 2463/02* (2013.01); *C08L 51/04* (2013.01); *C08L 2201/02* (2013.01); *C08L 2201/08* (2013.01); *C08L 2203/206* (2013.01); *C08L 2205/03* (2013.01); *C08L 2205/035* (2013.01); *C08L 2205/06* (2013.01); *C08L 2207/04* (2013.01); *C08L 2207/20* (2013.01)

(58) Field of Classification Search
CPC ........ C08L 2207/20; C08L 67/02; C08L 69/00; C08L 55/02; C08L 51/04
See application file for complete search history.

(56) References Cited

U.S. PATENT DOCUMENTS

| | | | | |
|---|---|---|---|---|
| 5,369,154 A | * | 11/1994 | Laughner | ................ C08L 67/00 523/436 |
| 6,894,112 B1 | * | 5/2005 | Weber | .................... C08L 67/02 525/65 |
| 2010/0273922 A1 | * | 10/2010 | Fujimoto | ................ C08L 69/00 524/145 |
| 2012/0022190 A1 | * | 1/2012 | Nagano | ................... C08L 67/02 524/114 |
| 2012/0289655 A1 | * | 11/2012 | Sumita | ................ B29C 45/0001 525/67 |
| 2013/0237644 A1 | | 9/2013 | Xin et al. | |

FOREIGN PATENT DOCUMENTS

| | | | |
|---|---|---|---|
| CN | 103012758 A | 4/2013 | |
| EP | 1000963 A1 * | 5/2000 | ........... C08K 5/1515 |
| JP | S60-088062 A | 5/1985 | |
| JP | 2001240738 A | 9/2001 | |
| JP | 2004067728 A | 3/2004 | |
| JP | 2004123823 A | 4/2004 | |
| JP | 2009155576 A | 7/2009 | |
| JP | 2011231283 A | 11/2011 | |
| JP | 2012077242 A | 4/2012 | |
| JP | 2013014747 A | 1/2013 | |
| JP | 2013147651 A | 8/2013 | |

(Continued)

OTHER PUBLICATIONS

Charpy Impact Test. UL Thermoplastics Testing Center. https://www.ulttc.com/en/solutions/test-methods/mechanical/charpy-impact-test.html. As viewed on Sep. 17, 2017.*

(Continued)

*Primary Examiner* — Stephen E Rieth
(74) *Attorney, Agent, or Firm* — Plumsea Law Group, LLC

(57) ABSTRACT

A reinforced thermoplastic resin composition of the present invention comprises a resin component (C) which consists of 80 to 100% by mass of a polycarbonate resin (A) and 0 to 20% by mass of a specific graft copolymer (G) (wherein the total amount of the polycarbonate resin (A) and the graft copolymer (G) is 100% by mass), a recycled and/or repelletized polyethylene terephthalate resin (B), an inorganic filler (D), and a glycidyl ether unit-containing polymer (E) having a weight average molecular weight of 3,800 to 60,000 in a specified ratio.

5 Claims, No Drawings

(56) References Cited

FOREIGN PATENT DOCUMENTS

| JP | 2014145029 A | 8/2014 |
|----|--------------|--------|
| TW | 200936679 A | 9/2009 |
| WO | 2011037172 A1 | 3/2011 |

OTHER PUBLICATIONS

International Search Report dated Oct. 27, 2015, in PCT Application No. PCT/JP2015/078168.
Japanese Office Action dated Feb. 17, 2015, in Japanese Patent Application No. 2014-243935.
Hui-Juan Chang et al: "A literature review of recycling and re-manufacturing technologies of the PET bottles", Food and Drug Research Annual Report 4, pp. 442-449,2013. [pp. 442-449].
Taiwanese Office Action dated Jul. 14, 2016 issued in Application No. 104132815.

\* cited by examiner

REINFORCED THERMOPLASTIC RESIN COMPOSITION AND MOLDED ARTICLE THEREOF

TECHNICAL FIELD

The present invention relates to a reinforced thermoplastic resin composition and a molded article that uses the resin.

Priority is claimed on Japanese Patent Application No. 2014-243935, filed Dec. 2, 2014, the content of which is incorporated herein by reference.

BACKGROUND ART

Thermoplastic resin compositions (such as ABS resins, polycarbonate/ABS resins, polyamide resins and polycarbonate/polyester resins) or resins prepared by reinforcing these thermoplastic resin compositions with inorganic fillers are widely used as the materials for the casings of mobile devices (such as notebook and tablet type personal computers, mobile phones including smart phones, digital cameras, and digital video cameras). The method used for producing these casings typically employs a method of molding the thermoplastic resin composition by injection molding, which enables the shape of the casing to be molded with relatively freedom.

In recent years, demands being made on the casings for mobile devices include further reductions in the thickness, the ability to withstand impacts and loads when stored inside a bag, and the ability to be used in an uncoated state in order to lower costs. In order to satisfy these demands, the thermoplastic resin compositions used in the casings require superior levels of rigidity, impact resistance, mechanical strength and flame retardancy when formed as a molded article, as well as favorable moldability during the molding process.

However, because thermoplastic resin compositions such as ABS resins, polycarbonate/ABS resins, polyamide resins and polycarbonate/polyester resins that have not been reinforced with an inorganic filler have low rigidity when formed into a molded article, they are unable to satisfy the demand for thinner casings. Further, polyamide resins exhibit high hygroscopicity, and therefore after molding, the molded article tends to be prone to warping, dimensional changes or deterioration in the external appearance over time.

Reinforced thermoplastic resin compositions prepared by adding an inorganic filler such as glass fiber or carbon fiber to the above thermoplastic resin compositions exhibit improved rigidity when formed as molded articles.

However, although reinforced thermoplastic resin compositions containing an ABS resin, polycarbonate/ABS resin or polycarbonate/polyester resin as the main component exhibit superior rigidity when formed as a molded article and enable a reduction in the wall thickness of the casing, the impact resistance when formed as a molded article is insufficient.

In particular, reinforced thermoplastic resin compositions containing a polycarbonate/polyester resin as the main component also exhibit poor thermal stability. Further, during the molding process, if the resin is held at high temperature inside the cylinder, then a transesterification between the polycarbonate resin and the polyester resin may generate a decomposition gas, increasing the likelihood of bubbles and external appearance defects known as silver streaks within the molded article. Furthermore, there is also a possibility that as a result of a decrease in the molecular weight of the polycarbonate resin, the inherent impact resistance and heat resistance and the like of the polycarbonate resin may be lost. Moreover, another problem is that the viscosity of polycarbonate resins may change during storage at high temperatures, resulting in a loss of molding stability during injection molding, and the occurrence of short shots and burrs in the obtained molded articles.

On the other hand, although reinforced thermoplastic resin compositions containing a polyamide resin as the main component exhibit excellent mechanical strength when formed into molded articles, the aforementioned problems of warping, dimensional changes and deterioration in the external appearance cannot be resolved. These problems are due to moisture absorption by the molded article after molding, and are not problems that can be resolved by drying the molding material prior to molding.

The following compositions have been proposed as reinforced thermoplastic resin compositions that are capable of forming molded articles having excellent impact resistance.

(1) A reinforced thermoplastic resin composition containing specific amounts of a polycarbonate resin, a graft copolymer, glass fiber that has been surface-treated with a water-soluble polyurethane, a glycidyl ether unit-containing polymer, and a phosphate ester-based flame retardant (Patent Document 1).

(2) A reinforced thermoplastic resin composition containing specific amounts of an aromatic polycarbonate resin, a fibrous filler that has been surface-treated with a polyamide, and a lubricant having at least one functional group selected from among a carboxyl group, a carboxylic acid anhydride group, an epoxy group and an oxazoline group (Patent Document 2).

The following compositions have been proposed as reinforced thermoplastic resin compositions that are capable of forming molded articles having excellent mechanic strength and molding stability.

(3) A reinforced thermoplastic resin composition containing specific amounts of a polycarbonate resin, a rubber-containing polymer, and a carbon fiber that has been bundled with a nylon-based bundling agent (Patent Document 3).

(4) A reinforced thermoplastic resin composition prepared by blending specific amounts of a polycarbonate resin, a polyethylene terephthalate resin that has been subjected to a deactivation treatment with a polycondensation catalyst, and a carbon black (Patent Document 4).

PRIOR ART LITERATURE

Patent Documents

Patent Document 1: Japanese Unexamined Patent Application, First Publication No. 2013-14747
Patent Document 2: Japanese Unexamined Patent Application, First Publication No. 2001-240738
Patent Document 3: Japanese Unexamined Patent Application, First Publication No. Sho 60-88062
Patent Document 4: Japanese Unexamined Patent Application, First Publication No. 2012-77242

DISCLOSURE OF INVENTION

Problems to be Solved by the Invention

However, the reinforced thermoplastic resin composition of (1) had insufficient impact resistance when formed as a molded article.

The reinforced thermoplastic resin composition of (2) had a problem in that the mechanical strength (such as the flexural strength) decreased when formed as a molded article.

The reinforced thermoplastic resin composition of (3) had insufficient impact resistance when formed as a molded article.

The reinforced thermoplastic resin composition of (4) had low rigidity when formed as a molded article.

Further, besides the reinforced thermoplastic resin compositions (1) to (4), a multitude of other reinforced thermoplastic resin compositions containing an added epoxy compound have been proposed with the aim of improving the mechanical strength of the molded article.

However, a reinforced thermoplastic resin composition having excellent balance between the moldability, and the rigidity, impact resistance, mechanical strength, heat resistance and flame retardancy of the molded article has yet to be proposed.

The present invention provides a reinforced thermoplastic resin composition that has favorable moldability, and can improve the rigidity, impact resistance, mechanical strength, heat resistance or flame retardancy of the obtained molded article, and also provides a molded article having superior rigidity, impact resistance, mechanical strength, heat resistance or flame retardancy.

Means for Solving the Problems

The present invention includes the following aspects.

1. A reinforced thermoplastic resin composition containing a resin component (C), which consists of 80 to 100% by mass of a polycarbonate resin (A) and 0 to 20% by mass of a graft copolymer (G) obtained by polymerizing a monomer mixture (m1) containing an aromatic alkenyl compound and a vinyl cyanide compound in the presence of a rubber-like polymer (G1) (wherein the total amount of the polycarbonate resin (A) and the graft copolymer (G) is 100% by mass), a polyethylene terephthalate resin (B), an inorganic filler (D), and a glycidyl ether unit-containing polymer (E), wherein the polyethylene terephthalate resin (B) is a recycled and/or repelletized resin, and the amount of the polyethylene terephthalate resin (B) is from 5 to 20 parts by mass per 100 parts by mass of the resin component (C), the amount of the inorganic filler (D) is from 20 to 50% by mass relative to 100% by mass of the reinforced thermoplastic resin composition, and the weight average molecular weight of the glycidyl ether unit-containing polymer (E) is from 3,800 to 60,000, and the amount of the glycidyl ether unit-containing polymer (E) is from 1 to 10 parts by mass per 100 parts by mass of the resin component (C).

2. A reinforced thermoplastic resin composition containing a resin component (C), which consists of 80 to 100% by mass of a polycarbonate resin (A) and 0 to 20% by mass of a graft copolymer (G) obtained by polymerizing a monomer mixture (m1) containing an aromatic alkenyl compound and a vinyl cyanide compound in the presence of a rubber-like polymer (G1) (wherein the total amount of the polycarbonate resin (A) and the graft copolymer (G) is 100% by mass), a polyethylene terephthalate resin (B), an inorganic filler (D), a glycidyl ether unit-containing polymer (E), and a phosphate ester-based flame retardant (F), wherein the polyethylene terephthalate resin (B) is a recycled and/or repelletized resin, and the amount of the polyethylene terephthalate resin (B) is from 5 to 20 parts by mass per 100 parts by mass of the resin component (C), the amount of the inorganic filler (D) is from 20 to 50% by mass relative to 100% by mass of the reinforced thermoplastic resin composition, the weight average molecular weight of the glycidyl ether unit-containing polymer (E) is from 3,800 to 60,000, and the amount of the glycidyl ether unit-containing polymer (E) is from 1 to 10 parts by mass per 100 parts by mass of the resin component (C), and the amount of the phosphate ester-based flame retardant (F) is from 1 to 25 parts by mass per 100 parts by mass of the resin component (C).

3. The reinforced thermoplastic resin composition disclosed in 1 or 2, wherein the resin component (C) consists of 80 to 95% by mass of the polycarbonate resin (A) and 5 to 20% by mass of the graft copolymer (G).

4. The reinforced thermoplastic resin composition disclosed in any one of 1 to 3, wherein the inorganic filler (D) is a carbon fiber.

5. The reinforced thermoplastic resin composition disclosed in any one of 1 to 3, wherein the inorganic filler (D) is a glass fiber.

6. A molded article obtained by molding the reinforced thermoplastic resin composition disclosed in any one of 1 to 5.

Effects of the Invention

The reinforced thermoplastic resin composition of the present invention has favorable moldability, and can improve the rigidity, impact resistance, mechanical strength, heat resistance and flame retardancy of the obtained molded article.

The molded article of the present invention has superior rigidity, impact resistance, mechanical strength, heat resistance and flame retardancy.

BEST MODE FOR CARRYING OUT THE INVENTION

The present invention is described below in detail.

In the following description, "(meth)acrylate" is a generic term meaning acrylate and methacrylate. Further, a "molded article" is an article obtained by molding the reinforced thermoplastic resin composition of the present invention.

Reinforced Thermoplastic Resin Composition

The reinforced thermoplastic resin composition of the present invention contains a resin component (C), a polyethylene terephthalate resin (B), an inorganic filler (D) and a glycidyl ether unit-containing polymer (E).

The resin component (C) consists of 80 to 100% by mass of a polycarbonate resin (A) and 0 to 20% by mass of a graft copolymer (G) (wherein the total amount of the polycarbonate resin (A) and the graft copolymer (G) is 100% by mass).

The graft copolymer (G) is obtained by polymerizing a monomer mixture (m1) in the presence of a rubber-like polymer (G1).

The reinforced thermoplastic resin composition of the present invention preferably also contains a phosphate ester-based flame retardant (F).

The reinforced thermoplastic resin composition of the present invention preferably also contains a flame retardant auxiliary (H).

If required, the reinforced thermoplastic resin composition of the present invention may also contain another flame retardant (I) other than the phosphate ester-based flame retardant (F), provided the effects of the present invention are not impaired.

Further, if required, the reinforced thermoplastic resin composition of the present invention may also contain other components besides the resin component (C), the polyethylene terephthalate resin (B), the inorganic filler (D), the glycidyl ether unit-containing polymer (E), the phosphate ester-based flame retardant (F), the flame retardant auxiliary (H) and the other flame retardant (I), provided the effects of the present invention are not impaired.

Each of the components ((A) to (I), (G1) and (m1) and the like) is described below.

<Polycarbonate Resin (A)>

The polycarbonate resin (A) is typically a resin obtained from a dihydroxydiarylalkane (also referred to as a "bis(hydroxyaryl)alkane"). The polycarbonate resin (A) may be either an unbranched resin or a branched resin. A single type of the polycarbonate resin (A) may be used alone, or a combination of two or more types may be used.

The polycarbonate resin (A) may be a commercially available resin, or a resin produced using a conventional production method may be used.

Examples of the production method for the polycarbonate resin (A) include a method in which a dihydroxy compound such as a dihydroxydiarylalkane or a polyhydroxy compound is reacted with phosgene or a carbonic acid diester, and a melt polymerization method.

Examples of the dihydroxydiarylalkane include compounds having alkyl groups in the ortho positions relative to the hydroxyl groups. Preferred specific examples of the dihydroxydiarylalkane include 4,4-dihydroxy-2,2-diphenylpropane (namely, bisphenol A), tetramethylbisphenol A, and bis(4-hydroxyphenyl)-p-diisopropylbenzene.

A branched polycarbonate resin (A) is produced, for example, by substituting a portion (for example, 0.2 to 2 mol %) of the dihydroxy compound with a polyhydroxy compound. Specific examples of this polyhydroxy compound include phloroglucinol, 4,6-dimethyl-2,4,6-tri(4-hydroxyphenyl)heptene, 4,6-dimethyl-2,4,6-tri(4-hydroxyphenyl)heptane, and 1,3,5-tri(4-hydroxyphenyl)benzene.

Material recycled from compact discs and the like may also be used as the polycarbonate resin (A).

The viscosity average molecular weight (Mv) of the polycarbonate resin (A) is preferably from 15,000 to 35,000. Provided the viscosity average molecular weight of the polycarbonate resin (A) is at least 15,000, the impact resistance of the molded article can be further improved. Provided the viscosity average molecular weight of the polycarbonate resin (A) is not more than 35,000, the moldability of the reinforced thermoplastic resin composition can be further improved. In terms of achieving a particularly superior balance between the mechanical strength and impact resistance of the molded article, and the fluidity of the reinforced thermoplastic resin composition, the viscosity average molecular weight of the polycarbonate resin (A) is more preferably from 17,000 to 25,000.

The viscosity average molecular weight of the polycarbonate resin (A) can be determined, for example, by the solution viscosity method. When a commercially available polycarbonate resin (A) is used, the catalog value may be used.

<Rubber-Like Polymer (G1)>

Examples of the rubber-like polymer (G1) include butadiene rubber, styrene-butadiene rubber, acrylonitrile-butadiene rubber, isoprene rubber, chloroprene rubber, butyl rubber, ethylene-propylene rubber, acrylic rubber, ethylene-propylene-nonconjugated diene rubber, epichlorohydrin rubber, diene-acrylic composite rubber, and silicone-acrylic composite rubber.

The diene component of a diene-acrylic composite rubber typically contains at least 50% by mass of butadiene units relative to the total mass of the diene rubber component. Examples of the diene rubber component include butadiene rubber, styrene-butadiene rubber, and acrylonitrile-butadiene rubber.

The acrylic rubber component of the diene-acrylic composite rubber is obtained by polymerizing an alkyl (meth)acrylate (f) and a polyfunctional monomer (g).

Examples of the alkyl (meth)acrylate (f) include alkyl acrylates (such as methyl acrylate, ethyl acrylate, n-propyl acrylate, n-butyl acrylate and 2-ethylhexyl acrylate) and alkyl methacrylates (such as hexyl methacrylate, 2-ethylhexyl methacrylate and n-lauryl methacrylate). A single type of the alkyl (meth)acrylate (0 may be used alone, or a combination of two or more types may be used.

Examples of the polyfunctional monomer (g) include allyl methacrylate, ethylene glycol dimethacrylate, propylene glycol dimethacrylate, 1,3-butylene glycol dimethacrylate, 1,4-butylene glycol dimethacrylate, triallyl cyanurate and triallyl isocyanurate. A single type of the polyfunctional monomer (g) may be used alone, or a combination of two or more types may be used.

Examples of the composite structure of the diene-acrylic composite rubber include a core-shell structure in which the periphery of the diene component is coated with the acrylic rubber component; a core-shell structure in which the periphery of the acrylic rubber component is coated with the diene component; a structure in which the diene component and the acrylic rubber component are mutually intertwined; and a copolymer structure in which a diene-based monomer unit and an alkyl (meth)acrylate-based monomer unit are arranged randomly.

The rubber-like polymer (G1) may be a commercially available polymer, or a polymer produced using a conventional production method may be used.

(Production Method for Rubber-Like Polymer (G1))

The rubber-like polymer (G1) is produced, for example, by subjecting the monomers that form the rubber-like polymer (G1) to emulsion polymerization in the presence of a radical polymerization initiator. For example, a diene-acrylic composite rubber latex can be obtained by adding a portion of the alkyl (meth)acrylate (f) to a diene rubber latex at room temperature and stirring the resulting mixture for about 5 minutes to 2 hours to obtain an enlarged diene rubber latex, adding an emulsifier, the alkyl (meth)acrylate (f) and the polyfunctional monomer (g) to this enlarged diene rubber latex, raising the temperature to 40 to 80° C., and then adding a radical polymerization initiator and performing polymerization for about 10 minutes to 2 hours. By using a preparation method that employs an emulsion polymerization, the particle size of the rubber-like polymer (G1) can be readily controlled.

In terms of enabling a further enhancement of the impact resistance of the molded article, the average particle size of the rubber-like polymer (G1) is preferably from 0.1 to 0.6 μm.

The average particle size describes the volume-average particle size measured with a Microtrac, using pure water as the measuring solvent.

<Monomer Mixture (m1)>

The monomer mixture (m1) contains an aromatic alkenyl compound (hereafter also referred to as monomer (a)) and a vinyl cyanide compound (hereafter also referred to as monomer (b)). If required, the monomer mixture may also contain another monomer (hereafter also referred to as monomer (c)) that is capable of copolymerization with the monomer (a) and the monomer (b).

Examples of the monomer (a) include styrene, α-methylstyrene and vinyltoluene, and styrene is preferred.

Examples of the monomer (b) include acrylonitrile and methacrylonitrile, and acrylonitrile is preferred.

Examples of the monomer (c) include alkyl methacrylates (such as methyl methacrylate, ethyl methacrylate and 2-ethylhexyl methacrylate), alkyl acrylates (such as methyl acrylate, ethyl acrylate and butyl acrylate), and maleimide compounds (such as N-phenylmaleimide).

In terms of achieving a superior balance between the impact resistance of the molded article and the moldability of the reinforced thermoplastic resin composition, the proportion of each monomer relative to the total mass of the monomer mixture (m1) is preferably from 50 to 90% by mass for the monomer (a), from 10 to 50% by mass for the monomer (b), and from 0 to 40% by mass for the monomer (c) (wherein the total amount of the monomers (a) to (c) is 100% by mass).

<Graft Copolymer (G)>

The graft copolymer (G) is obtained by polymerizing the monomer mixture (m1) in the presence of the rubber-like polymer (G1). In other words, the graft copolymer (G) is a copolymer in which molecular chains (G2) formed from the monomer mixture (m1) are grafted to the rubber-like polymer (G1). A single type of the graft copolymer (G) may be used alone, or a combination of two or more types may be used.

The amount of the rubber-like polymer (G1) is preferably from 0.5 to 3.5% by mass relative to the resin component (C) (100% by mass). Provided the amount of the rubber-like polymer (G1) is at least 0.5% by mass, the impact resistance of the molded article can be further improved. Provided the amount of the rubber-like polymer (G1) is not more than 3.5% by mass, the moldability of the reinforced thermoplastic resin composition can be further improved, and the external appearance of the molded article also improves.

Each molecular chain (G2) contains units of the monomer (a) and units of the monomer (b) as essential components, and may also include units of the other monomer (c) capable of copolymerization with these monomers as an optional component. Preferred ranges for the proportion (% by mass) of each of these monomer units relative to the total of all the monomer units that constitute the molecular chain (G2) are the same as the preferred ranges for the proportion of each monomer relative to the total mass of the monomer mixture (m1).

The graft copolymer (G) preferably includes an acetone-soluble fraction of 1 to 30% by mass relative to the total mass of the graft copolymer (G), and the reduced viscosity of the acetone-soluble fraction, measured at 25° C. as a 0.2 g/dL N,N-dimethylformamide solution, is preferably from 0.3 to 0.7 dL/g.

Provided the acetone-soluble fraction is not more than 30% by mass (an acetone-insoluble fraction of at least 70% by mass), the surface external appearance of the molded article improves, and the moldability of the reinforced thermoplastic resin composition also improves. Provided the acetone-soluble fraction is at least 1% by mass (an acetone-insoluble fraction of not more than 99% by mass), the tear strength of the molded article improves.

Provided the reduced viscosity of the acetone-soluble fraction is at least 0.3 dL/g, the tear strength of the molded article improves. Provided the reduced viscosity of the acetone-soluble fraction is not more than 0.7 dL/g, the moldability of the reinforced thermoplastic resin composition also improves, and the surface external appearance of the molded article improves.

The method used for measuring the acetone-soluble fraction is as follows.

First, 2.5 g of the graft copolymer is immersed in 90 mL of acetone, and following heating at 65° C. for 3 hours, a centrifugal separation is performed at 1,500 rpm for 30 minutes using a centrifuge. Subsequently, the supernatant is removed, the residue is dried in a vacuum dryer at 65° C. for 12 hours, and the dried sample is then weighed. Based on the difference in mass (2.5 g–the dried sample mass), the proportion (%) of the acetone-soluble fraction in the graft copolymer can be determined.

The reduced viscosity of the acetone-soluble fraction is measured at 25° C. as a 0.2 g/dL N,N-dimethylformamide solution.

The acetone-soluble fraction is a polymer that is the same as the molecular chain (G2), but is not grafted to the rubber-like polymer (G1). The acetone-soluble fraction is often produced at the same time as the grafting of the molecular chain (G2) to the rubber-like polymer (G1). Accordingly, the graft copolymer (G) usually includes an acetone-soluble fraction and an acetone-insoluble fraction.

(Production Method for Graft Copolymer (G))

The graft copolymer (G) is obtained by performing a graft polymerization of the monomer mixture (m1) in the presence of the rubber-like polymer (G1).

The graft polymerization method is preferably an emulsion polymerization method. For example, a latex of the graft copolymer (G) can be obtained by adding an emulsifier and the monomer mixture (m1) to a latex of the rubber-like polymer (G1) at room temperature, raising the temperature to 50 to 80° C., and then adding a radical polymerization initiator and performing polymerization for about 30 minutes to 3 hours.

Furthermore, during the graft polymerization, any of various chain transfer agents may be added to alter the molecular weight of the graft copolymer (G), the grafting ratio, or the reduced viscosity of the acetone-soluble fraction.

<Resin Component (C)>

The resin component (C) is the main resin component, and is included in the greatest amount among the resin components contained in the reinforced thermoplastic resin composition of the present invention.

The resin component (C) consists of 80 to 100% by mass of the polycarbonate resin (A) and 0 to 20% by mass of a graft copolymer (G) (wherein the total amount of the polycarbonate resin (A) and the graft copolymer (G) is 100% by mass), preferably consists of 80 to 95% by mass of the polycarbonate resin (A) and 5 to 20% by mass of a graft copolymer (G), and more preferably consists of 90 to 95% by mass of the polycarbonate resin (A) and 5 to 10% by mass of a graft copolymer (G).

Provided the proportion of the polycarbonate resin (A) satisfies the above range, the impact resistance of the reinforced thermoplastic resin composition is favorable. In particular, provided the proportion of the polycarbonate resin (A) is at least as large as the lower limit of the above range, the flame retardancy, mechanical strength and rigidity of the molded article can be improved, and provided the proportion is not more than the upper limit, the moldability of the reinforced thermoplastic resin composition can be further improved.

Provided the proportion of the graft copolymer (G) satisfies the above range, the moldability of the reinforced thermoplastic resin composition is favorable. In particular, provided the proportion of the graft copolymer (G) is not more than the upper limit of the above range, the flame retardancy, mechanical strength and rigidity of the molded article can be improved, and provided the proportion is at least as large as the lower limit, the moldability of the reinforced thermoplastic resin composition can be further improved.

<Polyethylene Terephthalate Resin (B)>

The polyethylene terephthalate (hereafter also abbreviated as "PET") resin (B) is a recycled and/or repelletized resin. Specific examples include recycled PET resins, repelletized PET resins, and recycled and repelletized PET resins.

Recycled PET resins are obtained by collecting and recycling PET resin products obtained by molding PET resins. Representative examples of these PET resin products include used PET bottles and foodstuff trays and the like, but the invention is not limited to such products, and off-grade PET resin products and waste materials generated during the molding process can also be used.

Recycled materials obtained by collecting used PET bottles and foodstuff trays and the like must be sorted to avoid contamination with other types of materials and metals and the like. Further, if the recycled material is washed with an alkali water or the like, then in order to ensure there is no residual alkali fraction that can promote hydrolysis of the PET resin, the recycled material must be washed thoroughly with water and dried.

The shape of the recycled PET resin is generally in the form of flakes, and the average particle size is preferably from 2 to 5 mm. Further, in order to remove foreign matter, a pelletized (repelletized) resin may be used.

Examples of the repelletized PET resin include resins obtained by pelletizing the recycled PET resin described above, and resins obtained by pelletizing commercially available pelletized products (virgin material). The pelletization is typically performed using an extruder or the like.

A single type of the PET resin (B) may be used alone, or a combination of two or more types may be used.

<Inorganic Filler (D)>

Examples of the inorganic filler (D) include inorganic fibers such as glass fiber and carbon fiber, metal-coated inorganic fibers, inorganic materials such as wollastonite, talc, mica, glass flakes, glass beads, potassium titanate, calcium carbonate, magnesium carbonate, carbon black and ketchen black, metals such as iron, copper, zinc, aluminum and alloys thereof, and fibers and powders of oxides of these metals. Among these, in terms of achieving a high level of rigidity with a small amount of the filler, the use of glass fiber or carbon fiber is preferred.

The aforementioned inorganic fibers, metal-coated inorganic fibers, inorganic materials, metals and alloys, and fibers and powders of oxides thereof may be surface-treated using a conventional coupling agent (such as a silane-based coupling agent or a titanate-based coupling agent) or some other form of surface treatment agent.

Further, the glass fiber or carbon fiber may be coated or bundled with a thermoplastic resin such as an ethylene/vinyl acetate copolymer or a polyamide, or a thermosetting resin such as a polyurethane resin or an epoxy resin.

The ratio between the major axis and the minor axis (major axis/minor axis) in a fiber cross-section of the glass fiber or carbon fiber is preferably from 2 to 6, and more preferably from 2 to 4. Provided the value of major axis/minor axis is at least 2, favorable impact resistance and strength can be obtained. Provided the value of major axis/minor axis is not more than 6, favorable moldability (extrusion workability) can be obtained.

The ratio of major axis/minor axis in the fiber cross-section is determined, for example, by using an electron microscope to observe the fiber cross-section at 8 different locations, and then averaging the value of major axis/minor axis across these 8 locations. When a commercially available fiber is used, the catalog value may be used.

The glass fiber or carbon fiber may be composed of long fibers or short fibers. However, short fibers having minimal anisotropy are preferred as the glass fiber or carbon fiber, and chopped fibers are particularly preferred.

A single type of the inorganic filler (D) may be used alone, or a combination of two or more types may be used.

<Glycidyl Ether Unit-Containing Polymer (E)>

The glycidyl ether unit-containing polymer (E) is a polymer that has a glycidyl ether unit within the molecule.

The glycidyl ether unit-containing polymer (E) preferably contains no halogen atoms (such as bromine). Further, the glycidyl ether unit-containing polymer (E) is preferably not a block polymer.

Examples of the glycidyl ether unit-containing polymer (E) include glycidyl ether type epoxy resins obtained by the reaction of a compound having a hydroxyl group with epichlorohydrin.

Examples of these glycidyl ether type epoxy resins include bisphenol type epoxy resins; novolac type epoxy resins; polyglycidyl ethers of aliphatic polyhydric alcohols; and polymers such as bisphenol type epoxy resins having a molecular chain which includes a unit represented by formula (1) shown below within the molecule (such as epoxy group-containing phenoxy resins).

Chemical Formula 1

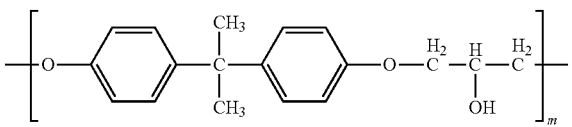

(1)

In the formula, m represents an integer of 1 or greater.

Examples of the bisphenol type epoxy resins include bisphenol A type epoxy resins, bisphenol F type epoxy resins, bisphenol AD type epoxy resins, and epoxy resins having bisphenol A and bisphenol F structures.

Examples of the novolac type epoxy resins include phenol novolac type epoxy resins and cresol novolac type epoxy resins.

Examples of the polyglycidyl ethers of aliphatic polyhydric alcohols include alkylene glycol diglycidyl ethers (such as ethylene glycol diglycidyl ether), polyoxyalkylene glycol diglycidyl ethers (such as diethylene glycol diglycidyl ether, polyethylene glycol diglycidyl ether, dipropylene glycol diglycidyl ether, tripropylene glycol diglycidyl ether and polypropylene glycol diglycidyl ether), and glycerol triglycidyl ether.

In terms of further enhancing the mechanical strength of the molded article, the glycidyl ether unit-containing polymer (E) is preferably a bisphenol A type epoxy resin, bisphenol F type epoxy resin, epoxy resin having bisphenol A and bisphenol F structures, phenol novolac type epoxy resin, cresol novolac type epoxy resin, or epoxy group-containing phenoxy resin.

The glycidyl ether unit-containing polymer (E) may be a liquid, a semisolid or a solid at normal temperatures (20° C.). If consideration is given to the workability and the like during mixing and kneading, then a solid is preferred.

A single type of the glycidyl ether unit-containing polymer (E) may be used alone, or a combination of two or more types may be used.

The weight average molecular weight of the glycidyl ether unit-containing polymer (E) is from 3,800 to 60,000, and is preferably from 5,500 to 50,000. Provided the weight average molecular weight of the glycidyl ether unit-containing polymer (E) is at least 3,800, the impact resistance of the molded article improves. Provided the weight average molecular weight of the glycidyl ether unit-containing polymer (E) is not more than 60,000, the moldability of the reinforced thermoplastic resin composition and the flame retardancy of the molded article are favorable.

The weight average molecular weight of the glycidyl ether unit-containing polymer (E) can be determined by mass spectrometry. When a commercially available glycidyl ether unit-containing polymer (E) is used, the catalog value may be used.

The glycidyl ether unit-containing polymer (E) may be a commercially available resin, or a polymer produced using a conventional production method may be used.

Examples of commercially available products of the glycidyl ether unit-containing polymer (E) include the jER (a registered trademark) series manufactured by Mitsubishi Chemical Corporation, the Epotohto (a registered trademark) series and Phenotohto (a registered trademark) series manufactured by Nippon Steel & Sumikin Chemical Co., Ltd., the AER (a registered trademark) series manufactured by Asahi Kasei E-Materials Corporation, and the EPICLON (a registered trademark) series manufactured by DIC Corporation.

<Phosphate Ester-Based Flame Retardant (F)>

Conventional compounds may be used as the phosphate ester-based flame retardant (F), and examples include compounds represented by formula (2) shown below.

Chemical Formula 2

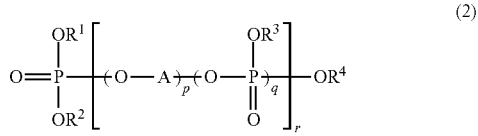

(2)

In the formula, each of $R^1$, $R^2$, $R^3$ and $R^4$ independently represents a hydrogen atom or a monovalent organic group, provided that $R^1$, $R^2$, $R^3$ and $R^4$ are not all simultaneously hydrogen atoms, A represents a (q+1) valent organic group, p represents 0 or 1, q represents an integer of 1 or greater, and r represents an integer of 0 or greater.

Examples of the monovalent organic group include substituted or unsubstituted alkyl groups, substituted or unsubstituted cycloalkyl groups, and substituted or unsubstituted aryl groups. In those cases where the alkyl group, cycloalkyl group or aryl group is substituted, there are no limitations on the number of substituents. Examples of these substituents include alkoxy groups, alkylthio groups, aryloxy groups and arylthio groups. The substituted organic group may be group containing a combination of two or more of these substituents (such as an arylalkoxyalkyl group) or group in which these substituents are linked via an oxygen atom, a nitrogen atom or a sulfur atom or the like (such as an arylsulfonylaryl group). Specific examples of the unsubstituted alkyl group, cycloalkyl group or aryl group include a methyl group, ethyl group, butyl group, octyl group, cyclohexyl group and phenyl group. Specific examples of the substituted alkyl group, cycloalkyl group or aryl group include alkoxyalkyl groups, arylalkyl groups, arylalkoxyalkyl groups and alkylphenyl groups.

Examples of the (q+1) valent organic group include functional groups having a structure in which q hydrogen atoms bonded to a carbon atom have been removed from an aforementioned monovalent organic group. The position of the carbon atom from which the hydrogen atom(s) are removed is arbitrary. Specific examples of the (q+1) valent organic group include alkylene groups and (substituted) phenylene groups.

Specific examples of the phosphate ester-based flame retardant (F) include trimethyl phosphate, triethyl phosphate, tributyl phosphate, trioctyl phosphate, tributoxyethyl phosphate, triphenyl phosphate, tricresyl phosphate, trixylyl phosphate, cresyldiphenyl phosphate, xylyldiphenyl phosphate, octyldiphenyl phosphate, diphenyl-2-ethylcresyl phosphate, tris(isopropylphenyl) phosphate, resorcinyl diphenyl phosphate, and polyphosphates.

Examples of the polyphosphates include bisphenol A bisphosphate, hydroquinone bisphosphate, resorcinol bisphosphate, trioxybenzene trisphosphate, bisphenol A bis (dicresyl phosphate), bisphenol A bis(diphenyl phosphate), phenylenebis(diphenyl phosphate), phenylenebis(ditolyl phosphate), and phenylenebis(dixylyl phosphate).

Polyphosphates can be obtained, for example, by a dehydration condensation of any of various diols such as polynuclear phenols (for example, bisphenol A) and orthophosphoric acid. Specific examples of the diols include hydroquinone, resorcinol, diphenylolmethane, diphenyloldimethylmethane, dihydroxybiphenyl, p,p'-dihydroxydiphenyl sulfone, and dihydroxynaphthalene.

Among the various options described above, the phosphate ester-based flame retardant (F) is preferably triphenyl phosphate, bisphenol A bis(diphenyl phosphate), phenylenebis(diphenyl phosphate) or phenylenebis(dixylyl phosphate).

The weight average molecular weight of the phosphate ester-based flame retardant (F) is preferably at least 326, more preferably greater than 326, and still more preferably 550 or greater. By using a phosphate ester-based flame retardant (F) having a weight average molecular weight that is at least 326, and preferably greater than 326, the moldability of the reinforced thermoplastic resin composition improves, and a molded article of excellent external appearance can be obtained.

In terms of the flame retardancy of the molded article, the weight average molecular weight of the phosphate ester-based flame retardant (F) is preferably not more than 692, more preferably not more than 690, and most preferably 686 or less.

The weight average molecular weight of the phosphate ester-based flame retardant (F) can be determined by mass spectrometry. When a commercially available phosphate ester-based flame retardant (F) is used, the catalog value may be used.

The phosphate ester-based flame retardant (F) may be a commercially available product, or a product produced using a conventional production method may be used.

Examples of commercially available products of the phosphate ester-based flame retardant (F) include the FP series manufactured by ADEKA Corporation, the Kronitex (a registered trademark) series manufactured by Ajinomoto Fine-Techno Co., Inc., the Reofos (a registered trademark) series manufactured by Chemtura Japan Ltd., and the CR series and PX series manufactured by Daihachi Chemical Industry Co., Ltd.

<Flame Retardant Auxiliary (H)>

The flame retardant auxiliary (H) is a component that prevents dripping of the reinforced thermoplastic resin composition upon combustion. Examples of the flame retardant auxiliary (H) include polytetrafluoroethylene, copolymers having a tetrafluoroethylene unit, and silicone-based polymers.

<Other Flame Retardant (I)>

Any of various conventional flame retardants can be used as the other flame retardant (I) besides the phosphate ester-based flame retardant (F), but halogen-free flame retardants besides the phosphate ester-based flame retardant (F) are preferred. Examples of these halogen-free flame retardants include phosphazene compounds, phosphorus-containing polyesters and inorganic flame retardants (such as red phosphorus and aluminum hydroxide).

Examples of red phosphorus-based flame retardants that may be used include materials that have been stabilized by coating with a thermosetting resin, and materials that have been stabilized by coating with a thermosetting resin and a metal hydroxide. Red phosphorus-based flame retardants are combustible if used alone, but may be master-batched by advance mixing with at least a portion of the resin component (C) or the polycarbonate resin (A).

<Other Components>

Examples of other components include other modifiers, release agents, light or heat stabilizers, antistatic agents, dyes and pigments.

<Amounts of Each Component>

In the reinforced thermoplastic resin composition, the amount of the PET resin (B) is from 5 to 20 parts by mass, and preferably from 5 to 10 parts by mass, per 100 parts by mass of the resin component (C). Provided the amount of the PET resin (B) is at least 5 parts by mass but not more than 20 parts by mass, excellent impact resistance can be achieved.

The amount of the inorganic filler (D), is from 20 to 50% by mass, and preferably from 30 to 45% by mass, relative to 100% by mass of the reinforced thermoplastic resin composition. Provided the amount of the inorganic filler (D) is at least 20% by mass, the rigidity and the like of the molded article improve. Provided the amount of the inorganic filler (D) is not more than 50% by mass, the moldability of the reinforced thermoplastic resin composition improves.

The amount of the glycidyl ether unit-containing polymer (E) is from 1 to 10 parts by mass, and preferably from 3 to 8 parts by mass, per 100 parts by mass of the resin component (C). Provided the amount of the glycidyl ether unit-containing polymer (E) is at least 1 part by mass, the impact resistance of the molded article improves. Provided the amount of the glycidyl ether unit-containing polymer (E) is not more than 10 parts by mass, the moldability of the reinforced thermoplastic resin composition and the flame retardancy of the molded article improve.

Accordingly, in the reinforced thermoplastic resin composition of the present invention, it is preferable that the amount of the PET resin (B) is from 5 to 10 parts by mass per 100 parts by mass of the resin component (C), the amount of the inorganic filler (D) is from 30 to 45% by mass relative to 100% by mass of the reinforced thermoplastic resin composition, and the amount of the glycidyl ether unit-containing polymer (E) is from 3 to 8 parts by mass per 100 parts by mass of the resin component (C).

The amount of the phosphate ester-based flame retardant (F) is typically from 0 to 25 parts by mass, preferably from 1 to 25 parts by mass, and still more preferably from 1 to 23 parts by mass, per 100 parts by mass of the resin component (C). Provided the amount of the phosphate ester-based flame retardant (F) is not more than 25 parts by mass, the impact resistance and heat resistance of the molded article improve. Provided the amount of the phosphate ester-based flame retardant (F) is at least 1 part by mass, the flame retardancy of the molded article and the moldability can be further improved.

When the reinforced thermoplastic resin composition contains polytetrafluoroethylene or a copolymer having a tetrafluoroethylene unit as the flame retardant auxiliary (H), from the viewpoint of the surface external appearance of the molded article, the amount of the flame retardant auxiliary (H) is preferably not more than 1 part by mass per 100 parts by mass of the resin component (C). There are no particular limitations on the lower limit, but in terms of ensuring a satisfactory effect due to the flame retardant auxiliary (H), the amount is preferably at least 0.1 parts by mass per 100 parts by mass of the resin component (C).

Accordingly, in the reinforced thermoplastic resin composition of the present invention, the amount of the polytetrafluoroethylene or copolymer having a tetrafluoroethylene unit is preferably from 0 to 1 part by mass, and more preferably from 0.1 to 1 part by mass, per 100 parts by mass of the resin component (C).

<Production Method for Reinforced Thermoplastic Resin Composition>

The reinforced thermoplastic resin composition of the present invention can be obtained by mixing the resin component (C) (the polycarbonate resin (A), and the graft copolymer (G) as required), the recycled and/or repelletized PET resin (B), the inorganic filler (D), the glycidyl ether unit-containing polymer (E), and if required, the phosphate ester-based flame retardant (F), the flame retardant auxiliary (H), the other flame retardant (I) besides the phosphate ester-based flame retardant (F), and any other components. Specifically, the composition can be obtained by mixing each of the components using a mixing device (for example, a Henschel mixer, tumbler mixer or Nauta mixer). Moreover, kneading may be performed using a kneading device (for example, a single screw extruder, twin screw extruder, Banbury mixer or co-kneader).

<Actions and Effects>

Because the reinforced thermoplastic resin composition of the present invention described above contains the resin component (C), the recycled and/or repelletized PET resin (B), the inorganic filler (D), the glycidyl ether unit-containing polymer (E) of specific weight average molecular weight, and the phosphate ester-based flame retardant (F) in specific proportions, the composition has favorable moldability, and the rigidity, impact resistance, mechanical strength, heat resistance or flame retardancy of the obtained molded article can be improved. A molded article for which the rigidity, impact resistance, mechanical strength, heat resistance and flame retardancy are all excellent can also be obtained.

Further, because the moldability is good, external appearance defects such as silver streaks are less likely to occur in the obtained molded article.

One molded article (Ma1) formed from the reinforced thermoplastic resin composition of the present invention has a flexural modulus that is preferably 5,900 MPa or higher, and more preferably from 6,600 to 15,800 MPa. Provided the flexural modulus is at least as high as the above lower limit, the rigidity is satisfactorily improved, whereas provided the flexural modulus is not more than the upper limit, the balance with other properties is favorable.

The molded article (Ma1) is a test piece prescribed in ISO 178:2013 obtained by injection molding of the reinforced thermoplastic resin composition of the present invention, and the "flexural modulus" is the value obtained by measuring the molded article (Ma1) in accordance with ISO 178:2013.

Another molded article (Ma2) formed from the reinforced thermoplastic resin composition of the present invention has a Charpy impact strength that is preferably 16 kJ/m$^2$ or higher, and more preferably from 17 to 29 kJ/m$^2$. Provided the Charpy impact strength is at least as high as the above lower limit, the impact resistance is satisfactorily improved, whereas provided the Charpy impact strength is not more than the upper limit, the balance with other properties is favorable.

The molded article (Ma2) is a test piece prescribed in ISO 179-1:2013 obtained by injection molding of the reinforced thermoplastic resin composition of the present invention, and the "Charpy impact strength" is the value obtained by measuring the molded article (Ma2) in accordance with ISO 179-1:2013.

The flexural strength of the molded article (Ma1) formed from the reinforced thermoplastic resin composition of the present invention is preferably 137 MPa or higher, and more preferably from 150 to 249 MPa. Provided the flexural strength is at least as high as the above lower limit, the mechanical strength is satisfactorily high, whereas provided the flexural strength is not more than the upper limit, the balance with other properties is favorable.

The "flexural strength" is the value obtained by measuring the aforementioned molded article (Ma1) in accordance with ISO 178:2013.

Another molded article (Ma3) formed from the reinforced thermoplastic resin composition of the present invention has a temperature of deflection that is preferably 87° C. or higher, and more preferably from 93 to 130° C. Provided the temperature of deflection is at least as high as the above lower limit, the heat resistance is satisfactorily high, whereas provided the temperature of deflection is not more than the upper limit, the balance with other properties is favorable.

The molded article (Ma3) is a test piece prescribed in ISO 75-2:2013 obtained by injection molding of the reinforced thermoplastic resin composition of the present invention, and the "temperature of deflection" is the value obtained by measuring the molded article (Ma3) by the flatwise method at a load of 1.80 MPa in accordance with ISO 75-2:2013.

Another molded article (Ma4) formed from the reinforced thermoplastic resin composition of the present invention has a flame retardancy that is preferably V-1 or higher.

The molded article (Ma4) is a test piece having a width of 12.7 mm, a length of 127 mm and a thickness of 0.2 mm obtained by injection molding of the reinforced thermoplastic resin composition of the present invention, and the "flame retardancy" is evaluated by subjecting the molded article (Ma4) to the procedure described in the Examples, in accordance with UL94.

Molded Article

The molded article of the present invention is obtained by molding the reinforced thermoplastic resin composition of the present invention.

Examples of the method used for molding the reinforced thermoplastic resin composition include injection molding methods (including film and glass insert molding), injection compression molding methods, extrusion methods, blow molding methods, vacuum molding methods, air pressure molding methods, calender molding methods and inflation molding methods. Among these, in terms of offering excellent mass producibility, and enabling molded articles of high dimensional precision to be obtained, injection molding methods and injection compression molding methods are preferred.

Being formed using the reinforced thermoplastic resin composition of the present invention, the molded article of the present invention exhibits superior levels of rigidity, impact resistance, mechanical strength, heat resistance and flame retardancy. Further, the external appearance is also favorable.

The molded article of the present invention can be used in the casings of personal computers (including notebooks and tablets), projectors (including liquid crystal projectors), televisions, printers, facsimiles, copiers, audio equipment, gaming machines, cameras (including video cameras and digital cameras), video equipment, musical instruments, mobile devices (such as electronic organizers and portable information terminals (PDA)), lighting equipment and communication equipment (including telephones (such as mobile phones and smart phones)), and also in fishing gear, play equipment (such as pachinko articles), vehicle products, furniture products, sanitary products, and construction products and the like. Among these various applications, in terms of making best use of the effects of the present invention, the molded article is particularly suited to use in the casings of mobile equipment (such as notebook and tablet type personal computers, and smart phones and the like).

EXAMPLES

A series of specific examples are described below. However, the present invention is in no way limited by these examples.

In the following description, unless specifically stated otherwise, the units "parts" and "%" mean "parts by mass" and "% by mass" respectively.

The methods used in the various measurements and evaluations, and the various components used, are as described below.

<Measurement Methods, Evaluation Methods>

Acetone-Soluble Fraction

First, 2.5 g of the graft copolymer was immersed in 90 mL of acetone, and following heating at 65° C. for 3 hours, a centrifugal separation was performed at 1,500 rpm for 30 minutes using a centrifuge. Subsequently, the supernatant was removed, the residue was dried in a vacuum dryer at 65° C. for 12 hours, and the dried sample was then weighed. Based on the difference in mass (2.5 g–the dried sample mass (g)), the proportion (%) of the acetone-soluble fraction in the graft copolymer was determined. The reduced viscosity of the acetone-soluble fraction was measured at 25° C. as a 0.2 g/dL N,N-dimethylformamide solution.

Charpy Impact Strength

The Charpy impact strength was measured in accordance with ISO 179-1:2013.

Flexural Strength and Flexural Modulus

The flexural strength and the flexural modulus were measured in accordance with ISO 178:2013. The flexural strength is an indicator of the mechanical strength of the molded article, and the flexural modulus is an indicator of the rigidity of the molded article.

Heat Resistance

The temperature of deflection was measured by the flat-wise method at a load of 1.80 MPa in accordance with ISO 75-2:2013.

Moldability

A liquid crystal display cover (thickness: 1 mm) for an A4-size notebook personal computer was molded. The moldability was evaluated on the basis of the presence or absence of short shots (unfilled portions) during molding, and the presence or absence of shrink marks, silver streaks or gas burns.

S: no short shots, shrink marks or gas burns
A: shrink marks were observed on some articles
B: short shots, gas burns or silver streaks were observed Flame Retardancy The reinforced thermoplastic resin composition was molded by injection molding to prepare a test piece (width: 12.7 mm, length: 127 mm, thickness: 2.0 mm), and the flame retardancy was evaluated in accordance with UL94 using the method described below.

The flame from a burner was brought into contact with the bottom end of the vertically clamped test piece for 10 seconds, and the burner flame was then removed from the test piece. One the flame had extinguished, the burner flame was once again brought into contact with the test piece, and the same operation was repeated. Then, based on the afterflame time following completion of the first flame contact, the total of the afterflame time and the afterglow time following the second flame contact, and the presence or absence of burning drips, a judgment was made as to whether or not the test piece was the equivalent of the V-1 standard in UL94, and the flame retardancy was evaluated against the following evaluation criteria. The V-1 standard states that "the first afterflame time exceeds 10 seconds but is not longer than 30 seconds, the total of the second afterflame time and afterglow time exceeds 30 seconds but is no longer than 60 seconds, and no burning drips fall."

A: the test piece had flame retardancy of V-1 level
B: the test piece did not have flame retardancy of V-1 level <Components>

Polycarbonate Resin (A)

NOVAREX 7021PJ (viscosity average molecular weight: 18,800) manufactured by Mitsubishi Engineering-Plastics Corporation was used as a polycarbonate resin (A-1).

Production of Graft Copolymer (G-1)

A copolymer latex composed of 85% of n-butyl acrylate units and 15% methacrylic acid units and having an average particle size of 0.08 μm (equivalent to a solid fraction of 2 parts) was added under stirring to a polybutadiene latex having a solid fraction concentration of 35% and an average particle size of 0.08 μm (equivalent to a solid fraction of 100 parts). Stirring was then continued for 30 minutes, thus obtaining an enlarged butadiene-based rubber-like copolymer (G1-1) latex having an average particle size of 0.28 μm.

The thus obtained enlarged butadiene-based rubber-like copolymer (G1-1) latex was placed in a reaction container, and 100 parts of distilled water, 4 parts of a wood rosin emulsifier, 0.4 parts of Demol N (a naphthalenesulfonic acid-formalin condensation product, manufactured by Kao Corporation), 0.04 parts of sodium hydroxide, and 0.7 parts of dextrose were added. The temperature was then raised under continuous stirring, and when the internal temperature reached 60° C., 0.1 part of ferrous sulfate, 0.4 parts of sodium pyrophosphate and 0.06 parts of sodium dithionite were added. Subsequently, a mixture containing the components listed below was added continuously in a dropwise manner added over a period of 90 minutes, the reaction conditions were maintained for one hour, and the reaction mixture was then cooled to obtain a graft copolymer (G-1) latex.

acrylonitrile: 30 parts
styrene: 70 parts
cumene hydroperoxide: 0.4 parts
tert-dodecylmercaptan: 1 part The graft copolymer (G-1) latex was coagulated with dilute sulfuric acid, washed, filtered and dried to obtain a dried powder of the graft copolymer (G-1).

The acetone-soluble fraction of the graft copolymer (G-1) was 27%. Further, the reduced viscosity of the acetone-soluble fraction was 0.3 dL/g.

Production of Graft Copolymer (G-2)

A reaction container was charged with raw materials in the proportions shown below, and a polymerization was performed by stirring the mixture under a nitrogen atmosphere at 50° C. for 4 hours, thus obtaining a rubber-like polymer (G1-2) latex.

n-butyl acrylate: 98 parts
1,3-butylene glycol dimethacrylate: 1 part
allyl methacrylate: 1 part
sodium dioctyl sulfosuccinate: 2.0 parts
deionized water: 300 parts
potassium persulfate: 0.3 parts
disodium phosphate dodecahydrate: 0.5 parts
sodium hydrogen phosphate dodecahydrate: 0.3 parts The thus obtained rubber-like polymer (G1-2) latex (equivalent to a solid fraction of 100 parts) was placed in a separate reaction container and diluted by adding 280 parts of ion-exchanged water, and the temperature was then raised to 70° C.

In a separate preparation, 0.7 parts of benzoyl peroxide was dissolved in 100 parts of a monomer mixture composed of acrylonitrile/styrene=29/71 (mass ratio), and following nitrogen substitution, the monomer mixture was added to the reaction container containing the aforementioned rubber-like polymer (G1-2) latex at a rate of 30 parts/hour using a constant rate pump. Following addition of all of the monomer mixture, the temperature inside the reaction container was raised to 80° C., and stirring was continued for a further 30 minutes, thus obtaining a graft copolymer (G-2) latex. The polymerization rate was 99%.

The graft copolymer (G-2) latex was added under stirring to a coagulation tank containing a volume of a 0.15% aqueous solution (90° C.) of aluminum chloride ($AlCl_3 \cdot 6H_2O$) equivalent to three times the volume of the total latex, thereby coagulating the latex. Following addition of all of the latex, the temperature inside the coagulation tank was increased to 93° C., and the mixture was left to stand at that temperature for 5 minutes. Following cooling, the mixture was dewatered using a centrifuge, and the solid was then washed and dried, yielding a dried powder of a graft copolymer (G-2).

The acetone-soluble fraction of the graft copolymer (G-2) was 21%. Further, the reduced viscosity of the acetone-soluble fraction was 0.70 dL/g.

Production of Graft Copolymer (G-3)

A graft copolymer (G-3) using a composite rubber of polybutadiene/poly(butyl acrylate) as a rubber-like polymer (G1-3) was prepared using the method described below.

A copolymer latex composed of 82% n-butyl acrylate units and 18% methacrylic acid units and having an average particle size of 0.10 μm (equivalent to a solid fraction of 0.4 parts) was added under stirring to a polybutadiene latex having a solid fraction concentration of 35% and an average particle size of 0.08 μm (equivalent to a solid fraction of 20 parts). Stirring was continued for a further 30 minutes, thus obtaining an enlarged diene-based rubber latex having an average particle size of 0.36 µm.

The thus obtained enlarged diene-based rubber latex (equivalent to a solid fraction of 20 parts) was placed in a reaction container, 1 part of the potassium salt of disproportionated rosin acid, 150 parts of ion-exchanged water, and a monomer mixture of the composition listed below were added, and following nitrogen substitution, the internal temperature was raised to 50° C.

n-butyl acrylate: 80 parts
allyl methacrylate: 0.32 parts
ethylene glycol dimethacrylate: 0.16 parts Subsequently, a solution prepared by dissolving 0.0002 parts of ferrous sulfate, 0.0006 parts of disodium ethylenediaminetetraacetate and 0.25 parts of rongalite in 10 parts of ion-exchanged water was added to the reaction container and reacted. The internal temperature at the completion of the reaction was 75° C. The temperature was then raised to 80° C. and reaction was continued for a further one hour, thus obtaining a rubber-like polymer (G1-3) latex composed of a composite rubber of an enlarged diene-based rubber and a poly(butyl acrylate)-based rubber. The polymerization rate was 98.8%.

The rubber-like polymer (G1-3) latex (equivalent to a solid fraction of 50 parts) was placed in a reaction container and diluted by adding 140 parts of ion-exchanged water, and the temperature was then raised to 70° C.

In a separate preparation, 0.35 parts of benzoyl peroxide was dissolved in 50 parts of a monomer mixture composed of acrylonitrile/styrene=29/71 (mass ratio), and following nitrogen substitution, the monomer mixture was added to the reaction container containing the aforementioned rubber-like polymer (G1-3) latex at a rate of 15 parts/hour using a constant rate pump. Following addition of all of the monomer mixture, the temperature inside the reaction container was raised to 80° C., and stirring was continued for a further 30 minutes, thus obtaining a graft copolymer (G-3) latex. The polymerization rate was 99%.

The graft copolymer (G-3) latex was added under stirring to a coagulation tank containing a volume of a 0.5% aqueous solution of sulfuric acid (90° C.) equivalent to three times the volume of the total latex, thereby coagulating the latex. Following addition of all of the latex, the temperature inside the coagulation tank was increased to 93° C., and the mixture was left to stand at that temperature for 5 minutes. Following cooling, the mixture was dewatered using a centrifuge, and the solid was then washed and dried, yielding a dried powder of a graft copolymer (G-3).

The acetone-soluble fraction of the graft copolymer (G-3) was 20%. Further, the reduced viscosity of the acetone-soluble fraction was 0.7 dL/g.

PET Resin (B)

PET-NPR manufactured by Yamaichi Co., Ltd. was used as a recycled PET resin (B-1).

A material produced by repelletizing GM502S (manufactured by Mitsubishi Chemical Corporation) at 260° C. using a twin-screw extruder was used as a repelletized PET resin (B-2).

GM502S manufactured by Mitsubishi Chemical Corporation was used as a PET resin (B-3) that had not been recycled or repelletized.

Inorganic Filler (D)

Chopped carbon fibers (TRO6U manufactured by Mitsubishi Rayon Co., Ltd., surface treatment agent: polyurethane) were used as an inorganic filler (D-1).

Chopped glass fibers (CSG 3PA-820 manufactured by Nitto Boseki Co., Ltd., surface treatment agent: polyurethane, major axis/minor axis ratio: 4) were used as an inorganic filler (D-2).

Chopped glass fibers (CSH 3PA-870 manufactured by Nitto Boseki Co., Ltd., surface treatment agent: polyurethane, major axis/minor axis ratio: 2) were used as an inorganic filler (D-3).

Chopped glass fibers (CSH 3PA-850 manufactured by Nitto Boseki Co., Ltd., surface treatment agent: epoxy resin, major axis/minor axis ratio: 2) were used as an inorganic filler (D-4).

Chopped glass fibers (CS3PE-455 manufactured by Nitto Boseki Co., Ltd., surface treatment agent: polyurethane, major axis/minor axis ratio: 1) were used as an inorganic filler (D-5).

Glycidyl Ether Unit-Containing Polymer (E)

An epoxy group-containing phenoxy resin (jER4250 manufactured by Mitsubishi Chemical Corporation, weight average molecular weight: 60,000) was used as a glycidyl ether unit-containing polymer (E-1).

An epoxy group-containing phenoxy resin (jER1256 manufactured by Mitsubishi Chemical Corporation, weight average molecular weight: 50,000) was used as a glycidyl ether unit-containing polymer (E-2).

A bisphenol A type epoxy resin (jER1010 manufactured by Mitsubishi Chemical Corporation, weight average molecular weight: 5,500) was used as a glycidyl ether unit-containing polymer (E-3).

A bisphenol A type epoxy resin (jER1009 manufactured by Mitsubishi Chemical Corporation, weight average molecular weight: 3,800) was used as a glycidyl ether unit-containing polymer (E-4).

A bisphenol A type epoxy resin (jER1004 manufactured by Mitsubishi Chemical Corporation, weight average molecular weight: 1,650) was used as a glycidyl ether unit-containing polymer (E-5).

A glycidyl ether unit-containing polymer (E-6) was produced using the method described below.

A 500 mL separable flask fitted with a stirrer, a thermometer, a nitrogen gas inlet and a condenser was charged with 82.42 parts of a bisphenol A type epoxy resin (epoxy equivalent weight: 467 g/eq), 6.3 parts of a bisphenol A type liquid epoxy resin (epoxy equivalent weight: 210 g/eq, hydrolyzable chlorine: 1.79%), 13.95 parts of bisphenol A, 19.6 parts of p-cumylphenol, 7.5 parts of a polyester resin (GV-335 manufactured by Japan U-pica Co., Ltd., acid value: 30 KOHmg/g) and 30 parts of xylene, and the temperature was then raised by heating under a nitrogen atmosphere.

When the internal temperature of the reaction system reached 80° C., 0.18 parts of a 5% aqueous solution of lithium chloride was added, and the temperature was then raised further. When the internal temperature of the reaction system reached 130° C., the pressure inside the reaction system was reduced, and the xylene and water were extracted from the system. Reaction was continued with the reaction temperature maintained at 160° C., and after one hour, nitrogen was introduced into the reaction system to return the internal pressure of the reaction system to normal pressure. Seven hours after the reaction temperature first reached 160° C., 20.25 parts of a high-molecular weight bisphenol A type epoxy resin (epoxy equivalent weight: 2,700 g/eq) was added, and after stirring for one hour, 100 parts of a polyester resin (GV-730 manufactured by Japan U-pica Co., Ltd., acid value: 3 KOHmg/g) was added, and reaction was continued at 180° C. for 10 hours, thus obtaining a high-molecular weight epoxy resin. When the thus obtained high-molecular weight epoxy resin was prepared for molecular weight measurement by GPC, an attempt was made to dissolve a 0.1 g sample of the resin in 10 mL of tetrahydrofuran, but about 0.05 g was insoluble. Following filtering through a 5C filter paper, the filtrate was subjected to a molecular weight measurement by GPC, and yielded a weight average molecular weight of 70,200.

Phosphate Ester-Based Flame Retardant (F)

Bisphenol A bis(diphenyl phosphate) (BAPP, manufactured by Ajinomoto Fine-Techno Co., Inc., weight average molecular weight: 692 (catalog value)) was used as a phosphate ester-based flame retardant (F-1).

Phenylenebis(dixylyl phosphate) (PX-200, manufactured by Daihachi Chemical Industry Co., Ltd., weight average molecular weight: 686 (catalog value)) was used as a phosphate ester-based flame retardant (F-2).

Phenylenebis(diphenyl phosphate) (CR-733S, manufactured by Daihachi Chemical Industry Co., Ltd., weight average molecular weight: 574 (catalog value)) was used as a phosphate ester-based flame retardant (F-3).

Triphenyl phosphate (TPP, manufactured by Daihachi Chemical Industry Co., Ltd., weight average molecular weight: 326 (catalog value)) was used as a phosphate ester-based flame retardant (F-4).

Flame Retardant Auxiliary (H)

Polytetrafluoroethylene (PTFE) was used as a flame retardant auxiliary (H-1).

Examples 1 to 28, Comparative Examples 1 to 8

The components described above were blended in the proportions shown in Tables 1 to 5, and kneaded using a twin-screw extruder, yielding pellets of a series of reinforced thermoplastic resin compositions. The pellets were dried at 100° C. for 3 hours, and the moldability was then evaluated by injection molding. Further, the Charpy impact strength, flexural strength, flexural modulus, heat resistance and flame retardancy were measured for each of the obtained molded articles. The evaluation results are shown in Tables 1 to 5.

TABLE 1

| | | | | Example | | | | | | |
|---|---|---|---|---|---|---|---|---|---|---|
| | | | | 1 | 2 | 3 | 4 | 5 | 6 | 7 |
| C | A | A-1 | % | 80 | 100 | 95 | 95 | 95 | 95 | 95 |
| | G | G-1 | % | — | — | — | — | — | — | — |
| | | G-2 | % | 20 | — | 5 | 5 | 5 | 5 | 5 |
| | | G-3 | % | — | — | — | — | — | — | — |
| B-1 | | | parts | 10 | 10 | 10 | 10 | 10 | 10 | 10 |
| B-2 | | | parts | — | — | — | — | — | — | — |
| D-1 | | | parts | — | — | 35.5 | — | — | — | — |
| D-2 | | | parts | 35.5 | 116.0 | — | 35.5 | 60.8 | 141.8 | — |
| D-3 | | | parts | — | — | — | — | — | — | 116.0 |
| D-4 | | | parts | — | — | — | — | — | — | — |
| D-5 | | | parts | — | — | — | — | — | — | — |
| E-1 (Mw: 60,000) | | | parts | — | — | — | — | — | — | — |
| E-2 (Mw: 50,000) | | | parts | 8 | 8 | 8 | 8 | 8 | 8 | 8 |
| E-3 (Mw: 5,500) | | | parts | — | — | — | — | — | — | — |
| E-4 (Mw: 3,800) | | | parts | — | — | — | — | — | — | — |
| F-1 (Mw: 692) | | | parts | — | — | — | — | — | — | — |
| F-2 (Mw: 686) | | | parts | 23 | 23 | 23 | 23 | 23 | 23 | 23 |
| F-3 (Mw: 574) | | | parts | — | — | — | — | — | — | — |
| F-4 (Mw: 326) | | | parts | — | — | — | — | — | — | — |
| H-1 | | | parts | 0.8 | 0.8 | 0.8 | 0.8 | 0.8 | 0.8 | 0.8 |
| D proportion | | | % | 20 | 45 | 20 | 20 | 30 | 50 | 45 |
| Charpy impact strength | | | kJ/m$^2$ | 23 | 22 | 17 | 17 | 20 | 23 | 20 |
| Flexural strength | | | MPa | 137 | 249 | 220 | 151 | 199 | 245 | 219 |
| Flexural modulus | | | MPa | 5,900 | 15,800 | 13,600 | 6,600 | 10,500 | 15,100 | 13,700 |
| Heat resistance | | | ° C. | 87 | 101 | 93 | 93 | 97 | 99 | 99 |
| Moldability | | | — | S | S | S | S | S | A | S |
| Flame retardancy | | | — | A | A | A | A | A | A | A |

TABLE 2

| | | | | Example | | | | | | |
|---|---|---|---|---|---|---|---|---|---|---|
| | | | | 8 | 9 | 10 | 11 | 12 | 13 | 14 |
| C | A | A-1 | % | 95 | 95 | 95 | 95 | 95 | 95 | 95 |
| | G | G-1 | % | — | — | 5 | — | — | — | — |
| | | G-2 | % | 5 | 5 | — | 5 | — | 5 | 5 |
| | | G-3 | % | — | — | — | — | 5 | — | — |
| B-1 | | | parts | 10 | 10 | 10 | 10 | 10 | 5 | 20 |
| B-2 | | | parts | — | — | — | — | — | — | — |
| D-1 | | | parts | — | — | — | — | — | — | — |
| D-2 | | | parts | — | — | 116.0 | 116.0 | 116.0 | 111.9 | 124.2 |
| D-3 | | | parts | — | — | — | — | — | — | — |
| D-4 | | | parts | 116.0 | — | — | — | — | — | — |
| D-5 | | | parts | — | 116.0 | — | — | — | — | — |
| E-1 (Mw: 60,000) | | | parts | — | — | — | — | — | — | — |

TABLE 2-continued

| | | | Example | | | | | | |
|---|---|---|---|---|---|---|---|---|---|
| | | | 8 | 9 | 10 | 11 | 12 | 13 | 14 |
| E-2 (Mw: 50,000) | parts | | 8 | 8 | 8 | 8 | 8 | 8 | 8 |
| E-3 (Mw: 5,500) | parts | | — | — | — | — | — | — | — |
| E-4 (Mw: 3,800) | parts | | — | — | — | — | — | — | — |
| F-1 (Mw: 692) | parts | | — | — | — | — | — | — | — |
| F-2 (Mw: 686) | parts | | 23 | 23 | 23 | 23 | 23 | 23 | 23 |
| F-3 (Mw: 574) | parts | | — | — | — | — | — | — | — |
| F-4 (Mw: 326) | parts | | — | — | — | — | — | — | — |
| H-1 | parts | | 0.8 | 0.8 | 0.8 | 0.8 | 0.8 | 0.8 | 0.8 |
| D proportion | % | | 45 | 45 | 45 | 45 | 45 | 45 | 45 |
| Charpy impact strength | kJ/m$^2$ | | 18 | 16 | 24 | 24 | 24 | 18 | 22 |
| Flexural strength | MPa | | 197 | 183 | 225 | 230 | 235 | 224 | 247 |
| Flexural modulus | MPa | | 13,500 | 13,200 | 14,100 | 14,000 | 14,000 | 13,600 | 15,200 |
| Heat resistance | °C. | | 99 | 98 | 99 | 99 | 99 | 98 | 99 |
| Moldability | — | | S | S | S | S | S | S | A |
| Flame retardancy | — | | A | A | A | A | A | A | A |

TABLE 3

| | | | | Example | | | | | | |
|---|---|---|---|---|---|---|---|---|---|---|
| | | | | 15 | 16 | 17 | 18 | 19 | 20 | 21 |
| C | A | A-1 | % | 95 | 95 | 95 | 95 | 95 | 95 | 95 |
| | G | G-1 | % | — | — | — | — | — | — | — |
| | | G-2 | % | 5 | 5 | 5 | 5 | 5 | 5 | 5 |
| | | G-3 | % | — | — | — | — | — | — | — |
| B-1 | | | parts | — | 10 | 10 | 10 | 10 | 10 | 10 |
| B-2 | | | parts | 10 | — | — | — | — | — | — |
| D-1 | | | parts | — | — | — | — | — | — | — |
| D-2 | | | parts | 116.0 | 110.3 | 111.9 | 117.7 | 97.2 | 98.0 | 99.7 |
| D-3 | | | parts | — | — | — | — | — | — | — |
| D-4 | | | parts | — | — | — | — | — | — | — |
| D-5 | | | parts | — | — | — | — | — | — | — |
| E-1 (Mw: 60,000) | | | parts | — | — | — | — | — | — | — |
| E-2 (Mw: 50,000) | | | parts | 8 | 1 | 3 | 10 | 8 | 8 | 8 |
| E-3 (Mw: 5,500) | | | parts | — | — | — | — | — | — | — |
| E-4 (Mw: 3,800) | | | parts | — | — | — | — | — | — | — |
| F-1 (Mw: 692) | | | parts | — | — | — | — | — | — | — |
| F-2 (Mw: 686) | | | parts | 23 | 23 | 23 | 23 | — | 1 | 3 |
| F-3 (Mw: 574) | | | parts | — | — | — | — | — | — | — |
| F-4 (Mw: 326) | | | parts | — | — | — | — | — | — | — |
| H-1 | | | parts | 0.8 | 0.8 | 0.8 | 0.8 | 0.8 | 0.8 | 0.8 |
| D proportion | | | % | 45 | 45 | 45 | 45 | 45 | 45 | 45 |
| Charpy impact strength | | | kJ/m$^2$ | 23 | 16 | 18 | 24 | 29 | 28 | 27 |
| Flexural strength | | | MPa | 231 | 151 | 158 | 232 | 150 | 152 | 156 |
| Flexural modulus | | | MPa | 14,000 | 13,600 | 13,700 | 14,100 | 10,000 | 10,100 | 10,300 |
| Heat resistance | | | °C. | 98 | 99 | 99 | 100 | 130 | 129 | 126 |
| Moldability | | | — | S | S | S | A | A | S | S |
| Flame retardancy | | | — | A | A | A | A | A | A | A |

TABLE 4

| | | | | Example | | | | | | |
|---|---|---|---|---|---|---|---|---|---|---|
| | | | | 22 | 23 | 24 | 25 | 26 | 27 | 28 |
| C | A | A-1 | % | 95 | 95 | 95 | 95 | 95 | 95 | 95 |
| | G | G-1 | % | — | — | — | — | — | — | — |
| | | G-2 | % | 5 | 5 | 5 | 5 | 5 | 5 | 5 |
| | | G-3 | % | — | — | — | — | — | — | — |
| B-1 | | | parts | 10 | 10 | 10 | 10 | 10 | 10 | 10 |
| B-2 | | | parts | — | — | — | — | — | — | — |
| D-1 | | | parts | — | — | — | — | — | — | — |
| D-2 | | | parts | 117.7 | 116.0 | 116.0 | 116.0 | 116.0 | 116.0 | 116.0 |
| D-3 | | | parts | — | — | — | — | — | — | — |
| D-4 | | | parts | — | — | — | — | — | — | — |
| D-5 | | | parts | — | — | — | — | — | — | — |

TABLE 4-continued

|  |  | Example | | | | | | |
|---|---|---|---|---|---|---|---|---|
|  |  | 22 | 23 | 24 | 25 | 26 | 27 | 28 |
| E-1 (Mw: 60,000) | parts | — | — | — | — | 8 | — | — |
| E-2 (Mw: 50,000) | parts | 8 | 8 | 8 | 8 | — | — | — |
| E-3 (Mw: 5,500) | parts | — | — | — | — | — | 8 | — |
| E-4 (Mw: 3,800) | parts | — | — | — | — | — | — | 8 |
| F-1 (Mw: 692) | parts | — | 23 | — | — | — | — | — |
| F-2 (Mw: 686) | parts | 25 | — | — | — | 23 | 23 | 23 |
| F-3 (Mw: 574) | parts | — | — | 23 | — | — | — | — |
| F-4 (Mw: 326) | parts | — | — | — | 23 | — | — | — |
| H-1 | parts | 0.8 | 0.8 | 0.8 | 0.8 | 0.8 | 0.8 | 0.8 |
| D proportion | % | 45 | 45 | 45 | 45 | 45 | 45 | 45 |
| Charpy impact strength | kJ/m² | 23 | 23 | 24 | 24 | 24 | 24 | 24 |
| Flexural strength | MPa | 232 | 230 | 232 | 233 | 240 | 237 | 237 |
| Flexural modulus | MPa | 14,200 | 13,800 | 13,800 | 13,800 | 13,900 | 13,800 | 13,800 |
| Heat resistance | °C | 97 | 99 | 98 | 96 | 99 | 99 | 99 |
| Moldability | — | S | S | S | A | S | S | S |
| Flame retardancy | — | A | A | A | A | A | A | A |

TABLE 5

|  |  |  |  | Comparative Example | | | | | | | |
|---|---|---|---|---|---|---|---|---|---|---|---|
|  |  |  |  | 1 | 2 | 3 | 4 | 5 | 6 | 7 | 8 |
| C | A | A-1 | % | 75 | 100 | 95 | 95 | 95 | 95 | 95 | 95 |
|  | G | G-1 | % | — | — | — | — | — | — | — | — |
|  |  | G-2 | % | 25 | — | 5 | 5 | 5 | 5 | 5 | 5 |
|  |  | G-3 | % | — | — | — | — | — | — | — | — |
| B-1 |  |  | parts | 10 | 10 | 10 | — | 10 | 10 | 10 | 10 |
| B-2 |  |  | parts | — | — | — | — | — | — | — | — |
| B-3 |  |  | parts | — | — | — | 10 | — | — | — | — |
| D-1 |  |  | parts | — | — | — | — | — | — | — | — |
| D-2 |  |  | parts | — | 173.3 | 109.5 | 116.0 | 125.8 | 121.7 | 116.0 | 116.0 |
| D-3 |  |  | parts | — | — | — | — | — | — | — | — |
| D-4 |  |  | parts | — | — | — | — | — | — | — | — |
| D-5 |  |  | parts | 35.5 | — | — | — | — | — | — | — |
| E-1 (Mw: 60,000) |  |  | parts | — | — | — | — | — | — | — | 12 |
| E-2 (Mw: 50,000) |  |  | parts | 8 | 8 | — | 8 | — | 8 | — | — |
| E-3 (Mw: 5,500) |  |  | parts | — | — | — | — | — | — | — | — |
| E-4 (Mw: 3,800) |  |  | parts | — | — | — | — | — | — | — | — |
| E-5 (Mw: 1,650) |  |  | parts | — | — | — | — | — | — | 8 | — |
| E-6 (Mw: 70,200) |  |  | parts | — | — | — | — | 12 | — | — | — |
| F-1 (Mw: 692) |  |  | parts | — | — | — | — | — | — | — | — |
| F-2 (Mw: 686) |  |  | parts | 23 | 23 | 23 | 23 | 23 | 30 | 23 | 23 |
| F-3 (Mw: 574) |  |  | parts | — | — | — | — | — | — | — | — |
| F-4 (Mw: 326) |  |  | parts | — | — | — | — | — | — | — | — |
| H-1 |  |  | parts | 0.8 | 0.8 | 0.8 | 0.8 | 0.8 | 0.8 | 0.8 | 0.8 |
| D proportion |  |  | % | 20 | 55 | 45 | 45 | 45 | 45 | 45 | 45 |
| Charpy impact strength |  |  | kJ/m² | 16 | 22 | 15 | 18 | 20 | 16 | 13 | 25 |
| Flexural strength |  |  | MPa | 135 | 251 | 172 | 248 | 259 | 242 | 227 | 242 |
| Flexural modulus |  |  | MPa | 5,700 | 15,700 | 13,600 | 14,200 | 14,300 | 14,000 | 13,500 | 13,800 |
| Heat resistance |  |  | °C | 79 | 100 | 99 | 98 | 98 | 84 | 97 | 99 |
| Moldability |  |  | — | S | B | S | B | B | S | S | A |
| Flame retardancy |  |  | — | B | B | A | A | B | A | A | B |

The amounts of the inorganic fillers (D), the glycidyl ether unit-containing polymers (E), the phosphate ester-based flame retardants (F) and the flame retardant auxiliary (H) shown in Tables 1 to 5 represent amounts (parts) per 100 parts of the resin component (C). Further, the "D proportion" represents the proportion (%) of the inorganic filler (D) relative to 100% of the reinforced thermoplastic resin composition.

As shown in Tables 1 to 5, the reinforced thermoplastic resin composition obtained in each of the Examples exhibited excellent moldability. Further, a molded article having excellent impact resistance, rigidity, mechanical strength, heat resistance and flame retardancy was able to be obtained from the reinforced thermoplastic resin composition obtained in each Example.

In contrast, in the case of Comparative Examples 1 to 8, at least one of the moldability of the reinforced thermoplastic resin composition, or the impact resistance, rigidity, mechanical strength, heat resistance or flame retardancy of the molded article was inferior.

Specifically, in the case of Comparative Example 1, in which the proportion of the polycarbonate resin (A) was small and the proportion of the graft copolymer (G) was large, the heat resistance, flame retardancy, rigidity and mechanical strength of the molded article were inferior.

In the case of Comparative Example 2, in which the proportion of the inorganic filler (D) was large, the moldability and the flame retardancy of the molded article were inferior.

In the case of Comparative Example 3, which contained no glycidyl ether unit-containing polymer (E), the impact resistance was inferior.

In the case of Comparative Example 4, which contained a resin that had not been recycled or repelletized as the PET resin (B), the moldability was inferior. Further, the impact resistance of the molded article was inferior compared with Examples 11 and 15, which had the same composition except for the variety of PET resin (B).

In the case of Comparative Example 5, in which the amount of the glycidyl ether unit-containing polymer (E) was 12 parts per 100 parts of the resin component (C), and the weight average molecular weight of the glycidyl ether unit-containing polymer (E) was 70,200, the moldability and the flame retardancy of the molded article were inferior.

In the case of Comparative Example 6, in which the amount of the phosphate ester-based flame retardant (F) was 30 parts per 100 parts of the resin component (C), the heat resistance of the molded article was inferior.

In the case of Comparative Example 7, in which the weight average molecular weight of the glycidyl ether unit-containing polymer (E) was 1,650, the impact resistance of the molded article was inferior.

In Comparative Example 8, in which the amount of the glycidyl ether unit-containing polymer (E) was 12 parts per 100 parts of the resin component (C), the flame retardancy of the molded article was inferior.

Further, based on a comparison of Example 11 and Comparative Example 3 it is evident that the reinforced thermoplastic resin composition of the present invention yields a molded article with superior impact resistance to that of a molded article obtained from a reinforced thermoplastic resin composition which does not contain the glycidyl ether unit-containing polymer (E).

Based on a comparison of Examples 11 and 15 and Comparative Example 4 it is evident that the reinforced thermoplastic resin composition of the present invention has superior moldability and yields a molded article with superior impact resistance compared with a reinforced thermoplastic resin composition that contains a PET resin that has not been recycled or repelletized.

INDUSTRIAL APPLICABILITY

The reinforced thermoplastic resin composition of the present invention is particularly useful as a material for the casings of mobile equipment (such as notebook and tablet type personal computers, mobile phones including smart phones, digital cameras, and digital video cameras).

We claim:

1. A reinforced thermoplastic resin composition comprising a resin component (C), which consists of 80 to 100% by mass of a polycarbonate resin (A) and 0 to 20% by mass of a graft copolymer (G) obtained by polymerizing a monomer mixture (m1) comprising an aromatic alkenyl compound and a vinyl cyanide compound in presence of a rubber-like polymer (G1), wherein a total amount of the polycarbonate resin (A) and the graft copolymer (G) is 100% by mass, a polyethylene terephthalate resin (B), an inorganic filler (D), a glycidyl ether unit-containing polymer (E), and a phosphate ester-based flame retardant (F), wherein the polyethylene terephthalate resin (B) is a repelletized resin or a recycled and repelletized resin, and an amount of the polyethylene terephthalate resin (B) is from 5 to 10 parts by mass per 100 parts by mass of the resin component (C), an amount of the inorganic filler (D) is from 30 to 45% by mass relative to 100% by mass of the reinforced thermoplastic resin composition, a weight average molecular weight of the glycidyl ether unit-containing polymer (E) is from 3,800 to 60,000, and an amount of the glycidyl ether unit-containing polymer (E) is from 3 to 8 parts by mass per 100 parts by mass of the resin component (C), the resin component (C) is included in the greatest amount among the resin components contained in the reinforced thermoplastic resin composition, the rubber-like polymer (G1) is selected from the group consisting of butadiene rubber, styrene-butadiene rubber, acrylonitrile-butadiene rubber, isoprene rubber, chloroprene rubber, butyl rubber, ethylene-propylene rubber, acrylic rubber, ethylene-propylene-nonconjugated diene rubber, epichlorohydrin rubber, diene-acrylic composite rubber, and silicone-acrylic composite rubber, the aromatic alkenyl compound is selected from the group consisting of styrene, α-methylstyrene and vinyltoluene, the vinyl cyanide compound is selected from the group consisting of acrylonitrile and methacrylonitrile, the glycidyl ether unit-containing polymer (E) is one or more selected from the group consisting of bisphenol type epoxy resin; novolac type epoxy resin; polyglycidyl ether of aliphatic polyhydric alcohol; and bisphenol type epoxy resin having a molecular chain which includes a unit represented by formula (1) shown below within the molecule:

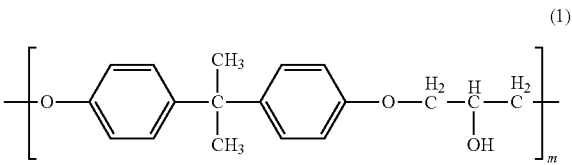

wherein m represents an integer of 1 or greater, and a resultant molded article formed from the reinforced thermoplastic resin composition has a Charpy impact strength ranging from 18 to 29 kJ/m2 measured in accordance with ISO 179-1:2013 using a notch having shape A after conditioning at a temperature of (23±2)° C. and a relative humidity of (50±5) percent for at least 16 hours, wherein the graft copolymer (G) includes an acetone-soluble fraction of 1 to 30% by mass relative to the total mass of the graft copolymer (G), wherein the reduced viscosity of the acetone-soluble fraction in graft copolymer (G) measured at 25° C. as a 0.2 g/dL N,N-dimethylformamide solution, is from 0.3 to 0.7 dL/g, wherein the inorganic filler comprises glass fiber or carbon fiber having a ratio between the major axis and the minor axis (major axis/minor axis) in a fiber cross-section of the glass fiber or carbon fiber in the inorganic filler (D) from 2 to 6, wherein the weight average molecular weight of the phosphate ester-based flame retardant (F) is 550 to 692, and wherein an amount of the phosphate ester-based flame retardant (F) is from 1 to 25 parts by mass per 100 parts by mass of the resin component (C).

2. The reinforced thermoplastic resin composition according to claim 1, wherein the resin component (C) consists of 80 to 95% by mass of the polycarbonate resin (A) and 5 to 20% by mass of the graft copolymer (G).

3. The reinforced thermoplastic resin composition according to claim 1, further comprising a flame retardant auxiliary polytetrafluoroethylene or copolymer having a tetrafluoroethylene unit (H), and
wherein the reinforced thermoplastic resin composition includes the amount of the polytetrafluoroethylene or copolymer having a tetrafluoroethylene unit is from 0.1 to 1 part by mass per 100 parts by mass of the resin component (C).

4. A molded article obtained by molding the reinforced thermoplastic resin composition according to claim 1.

5. A process for producing a reinforced thermoplastic resin composition, comprising the steps of:
providing a repelletized polyethylene terephthalate resin or a recycled and repelletized resin (B); and
compounding a resin component (C), which consists of 80 to 100% by mass of a polycarbonate resin (A) and 0 to 20% by mass of a graft copolymer (G) obtained by polymerizing a monomer mixture (m1) comprising an aromatic alkenyl compound and a vinyl cyanide compound in presence of a rubber-like polymer (G1), wherein a total amount of the polycarbonate resin (A) and the graft copolymer (G) is 100% by mass, the polyethylene terephthalate resin (B), an inorganic filler (D), a glycidyl ether unit-containing polymer (E), and a phosphate ester-based flame retardant (F), wherein
the polyethylene terephthalate resin (B) is contained in an amount of from 5 to 10 parts by mass per 100 parts by mass of the resin component (C),
an amount of the inorganic filler (D) is from 30 to 45% by mass relative to 100% by mass of the reinforced thermoplastic resin composition,
a weight average molecular weight of the glycidyl ether unit-containing polymer (E) is from 3,800 to 60,000, and an amount of the glycidyl ether unit-containing polymer (E) is from 3 to 8 parts by mass per 100 parts by mass of the resin component (C),
the resin component (C) is included in the greatest amount among the resin components contained in the reinforced thermoplastic resin composition,
the rubber-like polymer (G1) is selected from the group consisting of butadiene rubber, styrene-butadiene rubber, acrylonitrile-butadiene rubber, isoprene rubber, chloroprene rubber, butyl rubber, ethylene-propylene rubber, acrylic rubber, ethylene-propylene-nonconjugated diene rubber, epichlorohydrin rubber, diene-acrylic composite rubber, and silicone-acrylic composite rubber,
the aromatic alkenyl compound is selected from the group consisting of styrene, α-methylstyrene and vinyltoluene,
the vinyl cyanide compound is selected from the group consisting of acrylonitrile and methacrylonitrile,
the glycidyl ether unit-containing polymer (E) is one or more selected from the group consisting of bisphenol type epoxy resin; novolac type epoxy resin; polyglycidyl ether of aliphatic polyhydric alcohol; and bisphenol epoxy resin having a molecular chain which includes a unit represented by formula (1) shown below within the molecule:

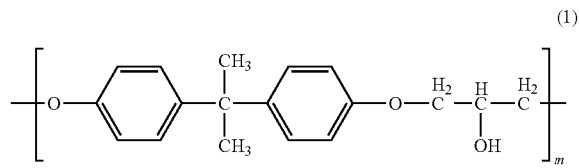

wherein m represents an integer of 1 or greater, and
a resultant molded article formed from the reinforced thermoplastic resin composition has a Charpy impact strength ranging from 18 to 29 kJ/m2 measured in accordance with ISO 179-1:2013 using a notch having shape A after conditioning at a temperature of (23±2)° C. and a relative humidity of (50±5) percent for at least 16 hours,
wherein the graft copolymer (G) includes an acetone-soluble fraction of 1 to 30% by mass relative to the total mass of the graft copolymer (G),
wherein the reduced viscosity of the acetone-soluble fraction in graft copolymer (G) measured at 25° C. as a 0.2 g/dL N,N-dimethylformamide solution, is from 0.3 to 0.7 d L/g,
wherein the inorganic filler comprises glass fiber or carbon fiber having a ratio between the major axis and the minor axis (major axis/minor axis) in a fiber cross-section of the glass fiber or carbon fiber in the inorganic filler (D) from 2 to 6,
wherein the weight average molecular weight of the phosphate ester-based flame retardant (F) is 550 to 692, and
wherein an amount of the phosphate ester-based flame retardant (F) is from 1 to 25 parts by mass per 100 parts by mass of the resin component (C).

* * * * *